(No Model.) 2 Sheets—Sheet 1.
T. C. PALMER.
MEANS FOR LOCKING NUTS ON BOLTS.
No. 492,829. Patented Mar. 7, 1893.
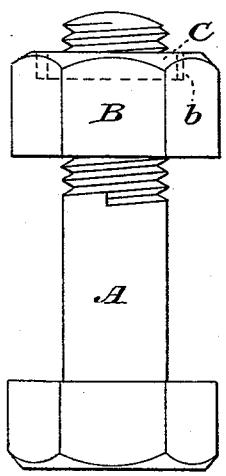
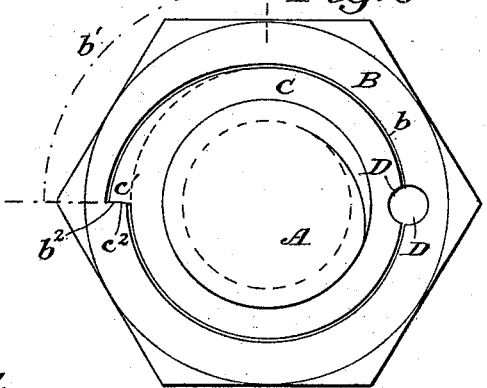
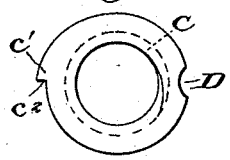
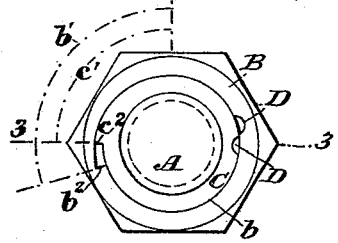
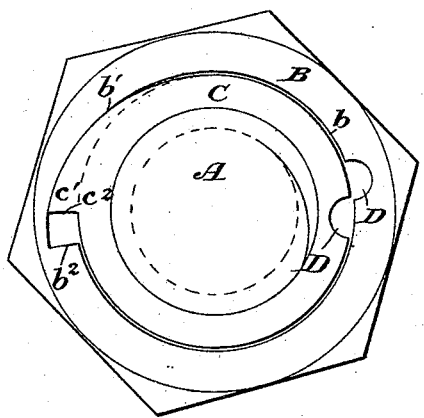
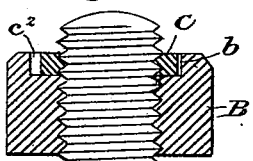
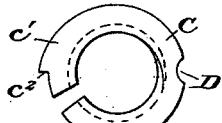
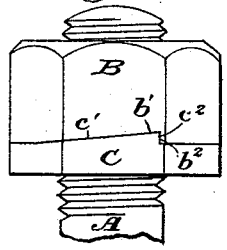
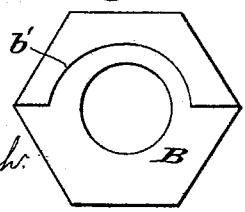
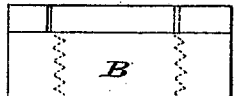
WITNESSES:
E. B. Bolton
M. A. Walsh
INVENTOR
Thomas Clark Palmer
BY
Richards
ATTORNEYS (No Model.) 2 Sheets—Sheet 2.
T. C. PALMER.
MEANS FOR LOCKING NUTS ON BOLTS.
No. 492,829. Patented Mar. 7, 1893.
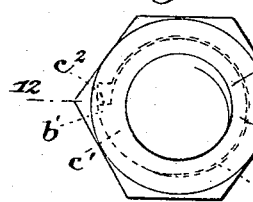
Fig. 10.
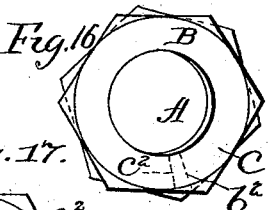
Fig. 16.
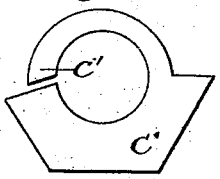
Fig. 25.
Fig. 17.
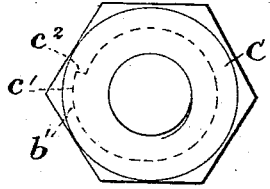
Fig. 11.
Fig. 18.
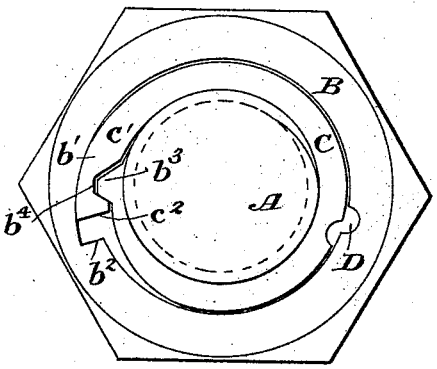
Fig. 21.
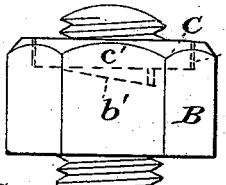
Fig. 12.
Fig. 13.
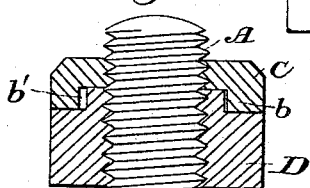
Fig. 15.
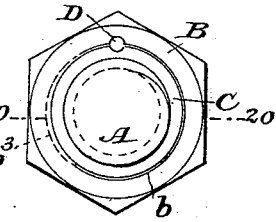
Fig. 19.
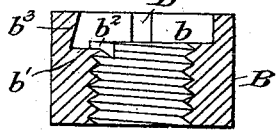
Fig. 20.
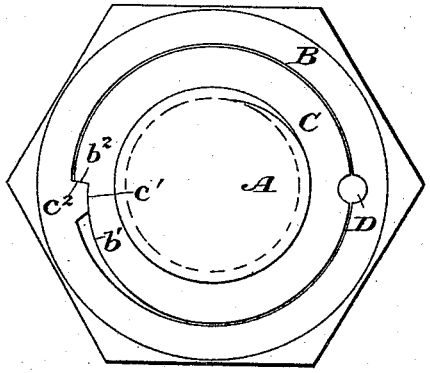
Fig. 22.
WITNESSES:
E. B. Bolton
M. A. Walsh
INVENTOR
Thomas Clark Palmer
BY
Richards
ATTORNEYS

UNITED STATES PATENT OFFICE.

THOMAS CLARK PALMER, OF MELBOURNE, VICTORIA.

MEANS FOR LOCKING NUTS ON BOLTS.

SPECIFICATION forming part of Letters Patent No. 492,829, dated March 7, 1893.

Application filed January 7, 1892. Serial No. 417,306. (No model.) Patented in Victoria October 24, 1890, No. 8,200; in New South Wales October 27, 1890, No. 2,570, and in New Zealand November 7, 1890, No. 4,689.

*To all whom it may concern:*

Be it known that I, THOMAS CLARK PALMER, clerk, a subject of the Queen of Great Britain, residing at Croxton House, 27 Mackenzie Street, Melbourne, in the British Colony of Victoria, have invented Improved Means for Locking Nuts on Bolts, (for which I have obtained patents in the following British Colonies: Victoria, dated October 24, 1890, No. 8,200; New South Wales, dated October 27, 1890, No. 2,570, and New Zealand, dated November 7, 1890, No. 4,689,) of which the following is a specification.

This invention relates to those classes of nuts which are provided with means whereby they may be locked or held upon their bolts so that they cannot shake loose or come off accidentally.

Its object is to provide a simple and inexpensive lock nut which can be easily rotated in one direction but is effectually prevented from accidental rotation in the opposite direction although means are provided to enable it to be screwed off the bolt when required.
It consists in certain improved means for locking nuts on bolts. These means are, first, a nut lock, and second, a nut having a certain provision in it for the purpose of enabling said nut lock to engage with it. This said nut lock consists of a tapped ring of metal adapted to screw on a bolt and having a projection at one part of either its inner or its outer peripheries terminating in a shoulder. This nut lock does not necessarily consist of a complete ring of metal inasmuch as the ring may be split or a small piece may be cut out of it so as to make it an imperfect ring. And further the projection instead of being on its periphery may if preferred be on its face and finally it is susceptible of several other modifications which are hereinafter described and claimed. The nut which forms the second part of my invention is made either with a recess in or a projection on its face corresponding to the shape of the nut lock for the purpose of enabling this latter to engage with it.

Referring to the accompanying drawings: Figure 1 is a side elevation of a right hand screw threaded bolt provided with a lock nut embodying my invention. Fig. 2 is a plan of said lock nut. Fig. 3 is a vertical central section on line 3, 3 Fig. 2 showing said lock nut applied to the end of a right hand screw-threaded bolt. Fig. 4 is a plan, and, Fig. 5 a side elevation of the tapped ring of metal or nut lock which as above stated constitutes one of the essential features of my invention. Figs. 6 and 7 are respectively a plan and a side elevation of one of the divided or split tapped metal rings or nut locks above referred to. Fig. 8 is a plan on a larger scale of that form of my invention which is illustrated in Figs. 1 to 3 and showing the nut lock in its unlocked position. Fig. 9 is a similar view to Fig. 8 but showing the nut lock in its locked position. Fig. 10 is a plan of a modification of my invention in which the nut lock fits outside a projection on the nut instead of inside a recess in the nut and is shown in its locked position, and, Fig. 11 is a similar view to Fig. 10 but showing said nut in its unlocked position. Fig. 12 is a vertical central section on line, 12, 12 Fig. 10 showing said modification of my invention applied to the upper end of a right hand screw threaded bolt. Fig. 13 is a vertical central section of the tapped ring or nut lock shown in Figs. 10, 11 and 12. Figs. 14 and 15 are side elevations, and Fig. 16 is a plan of another modification of my invention in which the nut lock is made with an inclined projection on its face instead of on its periphery and in which the nut is made to correspond therewith. Fig. 14 shows same in its unlocked, and Figs. 15 and 16 in its locked position. Fig. 17 is a similar view to Fig. 2 but showing a modification wherein an eccentric projection is provided on the nut and a corresponding recess is formed in the tapped ring or nut lock instead of as in said Fig. 2 the eccentric recess being in the nut and the projection on the nut lock. Fig. 18 is a corresponding view to Fig. 15 but showing the nut lock arranged inside a recess in the upper or outer face of the nut instead of alongside the lower or inner face thereof. Fig. 19 is a plan of the arrangement shown in Fig. 18, and, Fig. 20 is a horizontal section on line 20, 20, Fig. 19. Fig. 21 is a plan view of a form of lock in which the ring C has its ends overlapping. Fig. 22 is a plan view showing the cam surface *c'* in the form of a projection.

Figs. 23 and 24 show plan and side views of the nut having instead of the circular recess, a recess with one half of the walls cut away. Fig. 25 shows the form of a ring adapted to this form of nut.

Similar letters of reference indicate the same or corresponding parts in all the figures.

Referring first to Figs. 1 to 5. A represents a right hand screw threaded bolt and B a nut thereon, while C represents my tapped ring or nut lock. In the arrangement shown in these figures the nut B is provided with a recess $b$ in its outer face into which the tapped ring or nut lock C is fitted. This recess is provided with an eccentric or cam-shaped side or part $b'$ while the tapped ring or nut lock C is formed with a correspondingly shaped projection $c'$ on its outer periphery as clearly illustrated in Figs. 2, 4, 8 and 9. In practice the nut lock C is fitted inside the recess $b$ in the nut B and is screwed onto the bolt A therewith, it being obvious that this can easily be accomplished by reason of the shoulder $b^2$ at the rear end of the cam or eccentric shaped part $b'$ of the nut B coming into contact with a corresponding shoulder $c^2$ on the rear end of the cam shaped or eccentric projection $c'$ on the tapped metal ring or nut lock C and so carrying the latter round with it.

When my improved lock nut has been screwed sufficiently far along the bolt A a slight backward turn is given to it in order to lock it upon the bolt by causing the inclined or cam shaped or eccentric surface $c'$ of the tapped ring or nut lock C to wedge between the bolt A and the inclined or cam shaped or eccentric surface $b'$ of the nut B thus effectually preventing any further backward rotation as will be well understood on reference to Fig. 9. In order that this nut may be unscrewed from the bolt when required I form two recesses D D one in the side of the metal ring or nut lock C and the other in the side of the recess $b$ in the nut B and I arrange said recesses in such a manner as that when said nut lock C and nut B are in their unlocked positions said recesses will agree with or be in opposition to each other as illustrated in Fig. 8 thus allowing a small pin or other projection to be inserted in the hole formed by said recesses so as to connect said nut lock and nut and so enable them to be screwed off together.

If preferred instead of the tapped metal ring or nut lock C being constructed in the form of a continuous ring as shown in Fig. 4 it may be split or divided as illustrated in Fig. 6. Or instead of being fitted inside a recess such as $b$ Figs. 1. 2. 3. 8. and 9 the tapped metal ring or nut lock C may be fitted outside a projection $b$ on said nut as illustrated in Figs. 10. 11 and 12 cam shaped inclined or eccentric surfaces $c'$ $b'$ being provided on said ring or nut lock and nut as before so that in the event of the latter tending to unscrew it would become jammed between the eccentric surface of said nut lock C and the bolt A and would thereby be prevented from any further backward rotation. At the same time it can easily be unscrewed if required by keeping the shoulders at the rear ends of the eccentric surfaces $c'$. $b'$ in engagement with each other which can be accomplished by holding the "flats" on the sides of the nut B and tapped ring or nut lock C in line with each other by the aid of the spanner employed for unscrewing them.

Another modification of my invention is illustrated in Figs. 14. 15 wherein the eccentric shaped projection on the periphery of the nut lock as shown in Figs. 1. 2. 8 and 9 is substituted by a wedge shaped or inclined surface $c'$ on the face of the tapped metal ring or nut lock C and wherein the eccentric recess in the nut B as shown in said figures is substituted by a correspondingly shaped recess in the face of the nut B so that in the event of the latter tending to unscrew it will ride up the inclined surface $c'$ on said nut lock C and will thereby become jammed and so be prevented from any further movement as will be well understood. At the same time by moving the shoulder $b^2$ at the rear end of the inclined surface $b'$ until it engages with the shoulder $c^2$ at the rear end of the inclined surface $c'$ the nut and nut lock can be unscrewed easily with the aid of a spanner.

It will be obvious that if preferred the arrangements illustrated in Figs. 1 to 12 may be reversed, that is the eccentric projection may be formed on the nut in Figs. 1 to 8 and the corresponding eccentric recess in the tapped ring or nut lock as is clearly illustrated in Fig. 17 wherein $b'$ represents said eccentric projection on said nut and $c'$ represents the corresponding recess in the nut lock in which said projection fits as shown. From this illustration the corresponding alteration of the arrangements shown in Figs. 10 to 13 and 14 to 16 will be easily understood it being borne in mind that the eccentric or inclined projections $c'$ and the correspondingly shaped recesses $b'$ may be substituted for each other, that is the projections may be on the nuts and the recesses in the nut locks.

Another modification of the arrangement shown in Figs. 14 to 16 is shown in Figs. 18 to 20 wherein the nut lock C is fitted inside a recess formed in the upper or outer face of the nut B instead of being arranged alongside the lower or inner face thereof as in the former case. An additional feature of this modification consists in undercutting that part of the recess $b$ of the nut which is adjacent to the inclined recess $b'$ as shown at $b^3$, that is said part $b^3$ overhangs the nut lock slightly so that as the side of said nut lock is raised by the inclines $b'$, $c'$ it will be forced in toward the bolt by said undercut part and will thereby be more securely jammed between the nut B and bolt A as will be well understood by all persons skilled in the art to which my invention relates.

Another modification having the same object as the one just described is illustrated in Fig. 21, wherein a split or divided tapped ring or nut lock C encircles the bolt and is provided with overlapping ends as shown. One of these said ends is formed with an eccentric projection $c'$ which fits inside a corresponding recess $b'$ in the nut B and one of said ends is formed with a projection $b^3$ having one side inclined, as shown, while the other overlapping end of said nut lock is formed with a recess $b^4$ preferably corresponding in shape to the projection $b^3$. This recess $b^4$ is also formed with one side inclined to correspond with the inclined side of the projection $b^3$, and the whole is so arranged as that when the nut B is turned backward to lock it upon the bolt the eccentric surfaces $b'$ $c'$ will force the overlapping ends of the nut lock C in toward the bolt as in the arrangements illustrated in Figs. 1 to 13 and will thereby draw the nut lock C tightly around the bolt by reason of the inclined surfaces of the projections $b^3$ and the recess $b^4$ in its ends sliding along each other.

In the modification shown in Figs. 23, 24 and 25 the nut B is not formed with a circular recess to recieve the nut lock C as in most of the previous arrangements, but one half of what would be the sides of said recess are cut away, the cam shaped surface $b'$ being formed on the remaining half. The nut lock C is made with eccentric projections $c'$ and to approximately correspond with the half cut away, that is, so that its sides correspond with three of the flats of the nut when said nut lock is in its unlocked or released position thereby enabling the nut and nut lock to be readily unscrewed from off the bolt by the aid of a spanner. Its operation is substantially the same as the previously described arrangements.

In nearly all the cases above described it will be obvious that the eccentric or inclined projection $c'$ may be dispensed with, a comparatively small projection $c'$ on the nut or nut lock as the case may be, being arranged to ride up the eccentric or inclined surfaces $b'$ as illustrated in Fig. 22.

Having now particularly described and ascertained the nature of my said invention, and in what manner the same is to be performed, I declare that what I claim is—

1. A nut lock consisting of a threaded nut B and a divided ring C, a shouldered connection between the nut and ring, and an eccentric bearing between opposing faces of the parts to cause locking action on reverse movement, said shoulder being at the end of the eccentric portion, substantially as described.

2. A nut lock consisting of a ring C formed with a projection $c'$ and a shoulder $c^2$, in combination with a screw threaded nut having a recess $b$ to which the ring is fitted, said recess being cam shaped and terminating in a shoulder $b^2$, substantially as described.

3. A nut lock consisting of a ring C formed with a cam shaped projection on its outer edge, a nut bearing a cam shaped recess to receive the outer edge of the ring, recesses D in the ring and the wall of the recess in the nut adapted to align with each other to form a pocket for the insertion of a pin, to allow the unscrewing of both ring and nut, and the pin, substantially as described.

4. A nut lock consisting of a nut having a cam shaped recess and a split ring having overlapping ends, one of the ends having a cam shaped portion $c'$ adapted to fit inside of the recess in the nut, substantially as described.

THOMAS CLARK PALMER.

Witnesses:
WALTER SMYTHE BAYSTON,
WALKER CHARLES HART.